United States Patent [19]
Halka et al.

[11] Patent Number: 5,367,945
[45] Date of Patent: Nov. 29, 1994

[54] FLOATING PISTON PIN RETAINER

[75] Inventors: Thomas G. Halka, Birch Run; Terry L. Clark, Byron, both of Mich.

[73] Assignee: General Motors Corporation, Detroit, Mich.

[21] Appl. No.: 106,685

[22] Filed: Aug. 16, 1993

[51] Int. Cl.$^5$ ............................................. F16J 1/14
[52] U.S. Cl. ............................... 92/187; 92/128; 92/216; 403/294; 403/397; 74/579 R
[58] Field of Search ............... 92/187, 188, 216, 128; 403/294, 397; 74/579 R

[56] References Cited

U.S. PATENT DOCUMENTS

| | | |
|---|---|---|
| 2,213,884 | 9/1940 | Ohmart . |
| 3,161,185 | 12/1964 | Justinien ............................ 92/187 |
| 5,111,737 | 5/1992 | Dormer et al. . |

FOREIGN PATENT DOCUMENTS

| | | | |
|---|---|---|---|
| 275098 | 1/1990 | Germany ............................ 403/397 |
| 0684298 | 12/1952 | United Kingdom ................. 92/187 |
| 0901688 | 2/1982 | U.S.S.R. .............................. 92/187 |

Primary Examiner—Thomas E. Denion
Attorney, Agent, or Firm—Charles K. Veenstra

[57] ABSTRACT

A piston connecting rod assembly has a floating piston pin that is retained in centered assembly by a retainer clip having hooked fingers that lock into grooves in one end of the piston bore and hooked stringers that lock the piston pin in position after installation. The clip is formed of any suitable resilient material such as glass filled thermoplastic.

6 Claims, 1 Drawing Sheet

FLOATING PISTON PIN RETAINER

TECHNICAL FIELD

This invention relates to wrist pin or piston pin joints and more particularly to piston and rod connections joined by a piston pin and including means for retaining the piston pin in the assembly. The terms wrist pin and piston pin are used interchangeably in this document as meaning the same thing.

BACKGROUND

It is known in the art relating to engines, compressors and the like to connect a reciprocable piston with the small end of a connecting rod by a wrist pin. The wrist pin may be pressed or otherwise retained in a transverse bore of either the piston or the rod or it may be of the full floating type. In the latter case some form of retainer is used to prevent the pin from sliding out of the bore and scoring the wall of the associated cylinder. In current automotive engine practice where floating pins are used, it is common to provide annular spring clips snapped into grooves on either end of the piston bore to retain the piston pin in the piston-connecting rod assembly.

SUMMARY OF THE INVENTION

The present invention provides an improved piston pin retainer in the form of a resilient and preferably non-metallic clip that is retained in added grooves of the piston adjacent the piston pin bore and then captures the piston pin upon its installation in the aligned bores of the piston and connecting rod.

These and other features of the invention will be more fully understood from the following description taken together with the accompanying drawings.

BRIEF DRAWINGS DESCRIPTION

In the drawings:

FIG. 1 is a partially exploded pictorial view of a piston-connecting rod assembly having a piston pin joint and retaining means according to the invention; and FIG. 2 is a cross-sectional view showing the assembled piston pin joint of FIG. 1.

DETAILED DESCRIPTION

Figure 1:
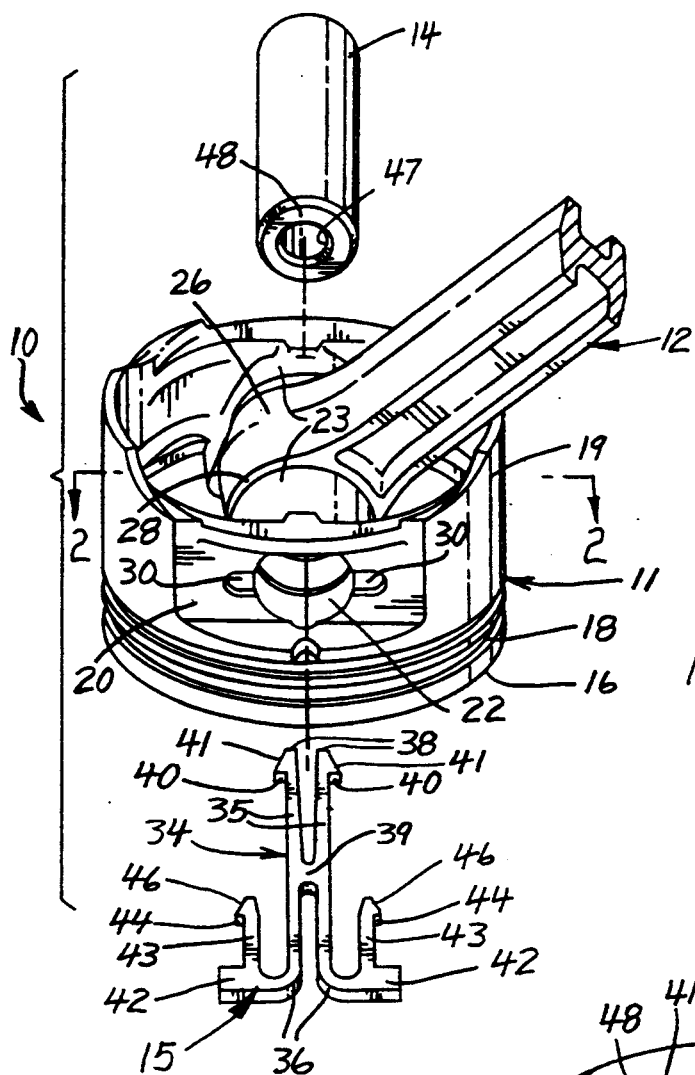

Referring now to the drawings in detail, numeral 10 generally indicates a piston and connecting rod assembly including a piston 11 and a connecting rod 12 connected together by a wrist pin or piston pin 14 retained in the assembly by a retainer clip 15.

The piston 11 is of generally conventional automotive construction and includes a head or crown portion 16 including a surrounding ring belt 18. A skirt 19 extends below the ring belt (the piston being shown inverted in FIG. 1) and includes opposed flats 20 which define opposite ends of a transverse bore 22 extending laterally through the piston. Internally, the bore extends through opposed bosses 23 of the piston and has an interrupted portion 24 centrally of the piston where the bosses are spaced apart and a pin end or small end 26 of the connecting rod 12 is received between them.

The connecting rod has a pin opening 27 in the form of a bore through the small end 26 which aligns with and forms an extension of the piston bore 22 to receive the piston pin 14. The small end has generally flat opposite sides 28 which engage the inner ends of the piston bosses 23 to center the connecting rod in the piston.

One of the piston bosses 23 has a pair of opposite slots or grooves 30 extending axially alongside the bore 22 from the outer end 20 to the inner end of the boss 23 which defines the interrupted portion 24 of the bore. Adjacent the inner end, the grooves are made deeper at 31 by cutting away the inner end of the boss outward of the grooves to provide faces 32 perpendicular to the pin axis.

The retainer clip 15 comprises a generally flat body 34 of suitable high temperature resilient material. A preferred example at present is a 35% glass reinforced aeromatic nylon thermoplastic composite capable of oil exposure in 300° C. temperatures. Metal, fiber or other composite materials might also be used. The body includes a pair of axially extending spaced parallel stringers 35 having base ends 36 and head ends 38. The stringers are centrally interconnected by a bridge 39. At their head ends 38 are outwardly projecting hooks 40 having backward angled end ramps 41. At their base ends 36 radial arms 42 extend outward from the stringers. From the radial arms 42, a pair of fingers 43 extend one from each arm 42 spaced from and parallel to one another and to the adjacent stringers 35. The fingers 43 extend inward to about the length of the associated piston boss 23 and each finger has at its inner end an outwardly projecting hook 44 having a backward angled end ramp 46.

The wrist pin or piston pin 14 is a cylindrical member having an axial bore 47 and generally flat annular ends 48. The outer surface is finished as a bearing journal surface for loose fitting in the piston bore 22 and the associated pin opening 27 of the connecting rod 12. With an aluminum piston, the pin 14 directly engages the finished bore. If the connecting rod is iron or steel, it is common to provide a bushing 50 in the pin opening to engage the pin and act as an extension of the piston bore 22 The piston pin is of the floating type rotatable in the piston bore 22 and the bushing 50 of the connecting rod and so a means for retaining the pin in its installed location is required. This function is provided by the retainer clip 15.

Assembly of the piston connecting rod assembly is as follows. The small end 26 of a connecting rod 12 is inserted into a piston 11 with the pin opening 27 and/or bushing 50 aligned with the transverse bore 22 of the piston and in the interrupted portion between the piston bosses 23. The retainer clip 15 is then inserted onto the bore 22 and through the connecting rod pin opening. The fingers 43 extend into the grooves 30 on either side of the bore and the radial arms 42 engage the flat 20 on one end of the piston bore 22. The hooks 44 on the end of the fingers 43 snap into the deeper portions 31 of the grooves and engage the faces 32 to retain the clip in the piston bore 22.

Figure 2:
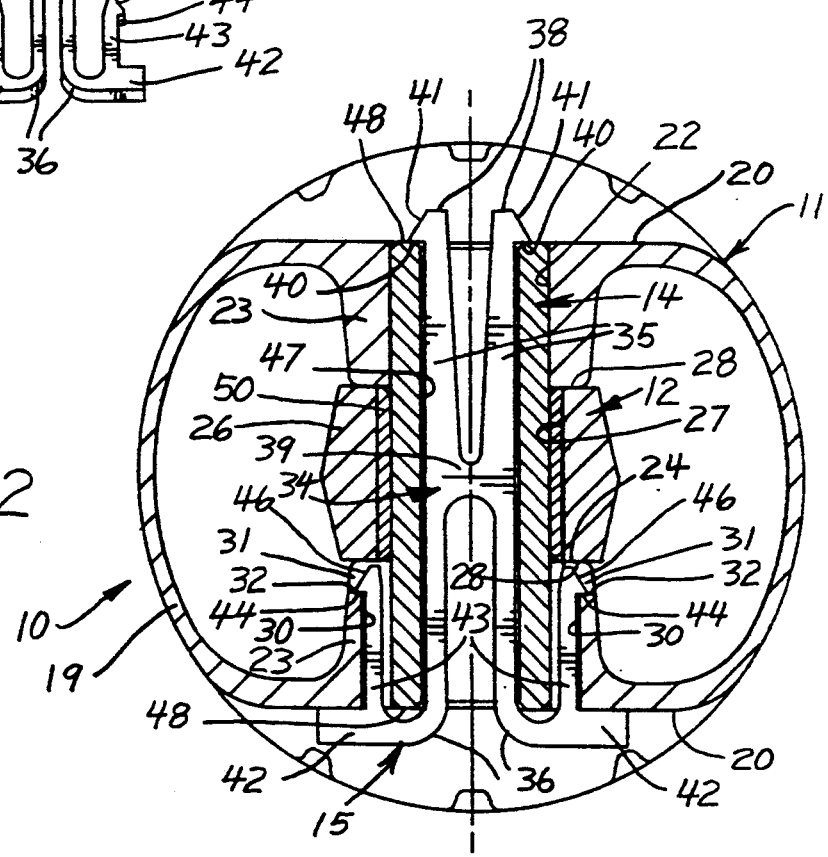

The piston pin 14 is then installed in the piston bore 22 and the connecting rod pin opening 27. This requires pushing the pin end 48 against the end ramps 41 of the retainer hooks 40 which causes the head ends 38 of the stringers to cam inwardly so that the hooks 40 can pass within the bore 47 of the piston pin 14. The pin 14 is then slid over the stringers and into the extended bore 22, 27 of the piston and connecting rod until one pin end 48 engages the radial arms 42 at the base end of the retainer clip 15. At this point, the hooks 40 extend beyond the other end 48 of the pin 14 so that the stringer ends 38 spring outward and the hooks 40 engage the other end 48 of the pin, locking it in its centered position in the piston bore 22 and retaining the piston connecting rod assembly 10 together. The assembly 10 is then complete as shown in FIGS. 1 and 2. Installation of the piston pin 14 also prevents the fingers 43 from being flexed inward and so positively maintains the hooks 44 engaged with the faces 32 and prevents the retainer clip from disengaging from the piston as long as the pin 14 is installed.

When it is desired to separate the assembly components, the process is reversed. Pliars or another suitable tool is used against the end ramps 41 to force the head ends 38 of the stringers inward so that the hooks 40 disengage from the pin end 48 and allow the piston pin 14 to be removed from the assembly. A similar tool engaging the end ramps 46 is then used to urge the fingers inward and disconnect the hooks 44 from the faces 32 so that the retainer clip can be removed from the grooves 30 adjacent the piston bore 22. The connecting rod 12 may then be removed from the piston and the parts are retained and may be reused upon reassembly.

While the illustrated embodiment involves a flat body having a pair of stringers interconnected between their ends and a radial arm and locking finger for each stringer, it is apparent that alternative embodiments could also be provided having similar characteristics. For example, a simplified clip could be made with only a single stringer, radial arm and locking finger. Optionally, a second stringer (without hook or radial arm) connected to the first by a bridge or the like could be added to span the pin bore and urge the first stringer into locking engagement with the pin end. Alternatively, the body could have a tubular form with slots separating it into two or more stringers with a radial base and fingers extending from the base.

While the invention has been described by reference to certain preferred embodiments, it should be understood that numerous changes could be made within the spirit and scope of the inventive concepts disclosed. It is therefore intended that the invention not be limited to the embodiments described but that it have the full scope permitted by the language of the following claims.

What is claimed is:

1. A piston and pin assembly comprising
a piston defining a transverse wrist pin bore, and a pair of grooves extending axially in the piston alongside the bore from an outer end thereof to an interrupted portion spaced inward from the end,
a connecting rod having a pin end receivable in the piston inwardly adjacent the interrupted portion and a pin opening connecting with and forming an extension of the bore,
a retaining clip comprising a body including a pair of axially extending spaced parallel stringers having base and head ends and connected intermediate the ends by a bridge, the stringers having at their head ends outwardly projecting hooks having backward angled end ramps, the stringers having at their base ends radial arms engagable with the piston adjacent the bore outer end, and a pair of fingers one extending from each radial arm spaced from and parallel to one another and the adjacent stringers, each finger having an inner end with an outwardly projecting hook having a backward angled end ramp,
the clip being received in the piston with the radial arms engaging the outer end, the stringers extending through the extended bore including the connecting rod, and the fingers lying within the grooves with the finger hooks engaging the interrupted portions to retain the clip in the piston bore, and
a cylindrical wrist pin having an axial bore and annular ends, the wrist pin being received in the extended piston bore including the connecting rod to retain the piston and rod together, the pin being retained by the clip between the Radial arms and the projecting hooks of the stringers engaging the annular ends of the wrist pin, the head ends of the stringers extending from the bridge being resiliently urged outward to retain the pin and movable inward by engagement of the ramps by an annular end of the pin to allow inward flexing of the stringers and installation of the wrist pin thereon, and the fingers being resiliently urged outward to retain the clip in the piston bore during handling, the fingers being locked in the installed position by the pin after assembly, the fingers being capable of flexing inward during installation of the clip to allow the finger hooks to enter the grooves and engage the interrupted portions.

2. A piston and connecting rod assembly comprising
a piston defining a transverse wrist pin bore, and at least one groove extending axially in the piston alongside the bore from an outer end thereof to an interrupted portion spaced inward from the end,
a connecting rod having a pin end receivable in the piston inwardly adjacent the interrupted portion and a pin opening connecting with and forming an extension of the bore,
a retaining clip comprising a body including at least one axially extending spaced parallel stringer having base and head ends, the stringer having at its head end an outwardly projecting hook having a backward angled end ramp, the stringer having at its base end a radial arm engagable with the piston adjacent the bore outer end, and a finger extending from the radial arm spaced from and parallel to the adjacent stringer, the finger having an inner end with an outwardly projecting hook having a backward angled end ramp,
the clip being received in the piston with the radial arm engaging the outer end, the stringer extending through the extended bore including the connecting rod, and the finger associated with and lying within a groove with the finger hook engaging the interrupted portion to retain the clip in the piston bore, and
a cylindrical wrist pin having an axial bore and annular ends, the wrist pin being received in the extended piston bore including the connecting rod to retain the piston and rod together, the pin being retained by the clip between the radial arm and the projecting hook of the stringer engaging the annular ends of the wrist pin, the head end of the stringer being resiliently urged outward to retain the pin and movable inward by engagement of the ramp by an annular end of the pin to allow inward flexing of the stringer and installation of the wrist pin thereon, and the finger being resiliently urged outward to retain the clip in the piston bore during handing, the finger being locked in the installed position by the pin after assembly, the finger being capable of flexing inward during installation of the clip to allow the finger hook to enter the groove and engage the interrupted portion.

3. The invention as in claim 2 wherein the number of stringers is at least two.

4. The invention as in claim 3 wherein the number of fingers and grooves is equal to the number of stringers.

5. A retaining clip comprising a body including at least one axially extending spaced parallel stringer having base and head ends, the stringer having at its head end an outwardly projecting hook having a backward angled end ramp, the stringer having at its base end a radial arm engagable with a piston adjacent a bore outer end in the piston, and a finger extending from each radial arm spaced from and parallel to the adjacent stringer, each finger having an inner end with an outwardly projecting hook having a backward angled end ramp.

6. The invention as in claim 5 wherein the body is of generally flat configuration and includes a pair of stringers interconnected between their ends and with a radial arm for each stringer and a finger extending from each radial arm, the fingers being spaced from and parallel to one another and to the stringers.

* * * * *